M. HANSEN.
GAUGE FOR EYEGLASS MOUNTINGS.
APPLICATION FILED MAY 20, 1920.
1,421,465.
Patented July 4, 1922.
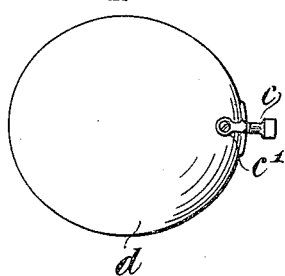
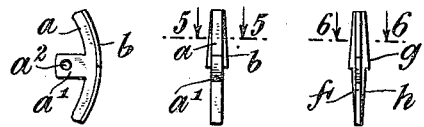
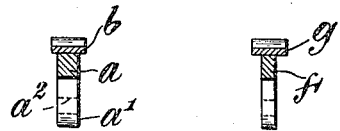
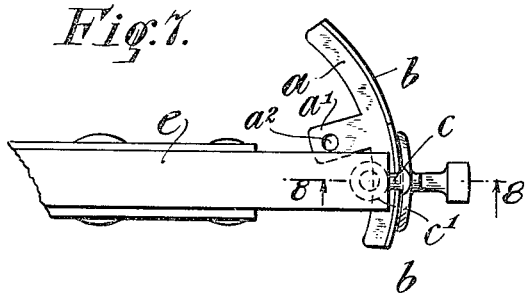
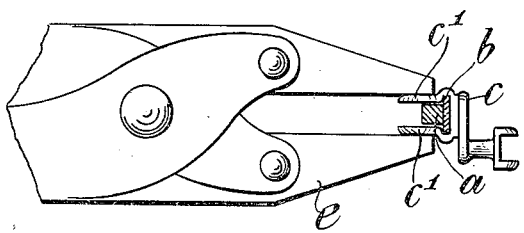
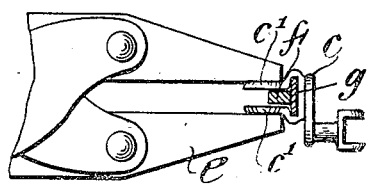
INVENTOR
Mannius Hansen
BY
Redding & Greeley
ATTORNEYS

UNITED STATES PATENT OFFICE.

MARINIUS HANSEN, OF BROOKLYN, NEW YORK.

GAUGE FOR EYEGLASS MOUNTINGS.

1,421,465.　　　　Specification of Letters Patent.　　Patented July 4, 1922.

Application filed May 20, 1920. Serial No. 382,906.

*To all whom it may concern:*

Be it known that I, MARINIUS HANSEN, a subject of the King of Norway, residing in the borough of Brooklyn, of the city of New York, in the State of New York, have invented certain new and useful Improvements in Gauges for Eyeglass Mountings, of which the following is a specification, reference being had to the accompanying drawing, forming a part hereof.

This invention relates to an improved gauge to be used in adjusting the straps of lens mountings to accommodate lenses of varying thicknesses, an ordinary pair of pliers being a suitable tool for effecting adjustment with the improved gauge. Gauges, as heretofore known, have not been entirely satisfactory either because they were too expensive for the average optician or they were not effective to insure an adjustment of the lens straps with that degree of nicety which is required. The improved gauge permits the use of ordinary pliers and yet is of such form as to insure the adjustment of the two lens straps into symmetrical relation to the lens to be received therebetween. Further, the adjustment is such as to bring the straps into parallelism with one another, so that the lens will be mounted in proper relation to the post. The improved gauge has the further advantage of cheapness of cost and facility of use. It is provided with a tapered flange which permits the ready introduction of the gauge between the lens straps regardless of the distance between the straps at their base, so that the initial positioning of the gauge requires no special care or skill on the part of the user. The invention will be described in greater detail in connection with the illustrated embodiment shown in the accompanying drawing, in which—

Figure 1 is a view in front elevation of a lens secured in its mounting.

Figure 2 is a view in side elevation of a gauge constructed in accordance with the invention.

Figure 3 is a view looking at the underside of the gauge shown in Figure 2.

Figure 4 is a view similar to Figure 3 of an improved gauge member of slightly different form from that of Figure 3.

Figures 5 and 6 are sectional views taken on the plane indicated by the lines 5—5 and 6—6 of Figures 3 and 4 respectively, and looking in the direction of the arrows.

Figure 7 is a view showing one of the gauge members in place during the bending of the lens straps with an ordinary pair of pliers.

Figure 8 is a view in side elevation of the parts shown in Figure 7, the gauge member being shown in sectional view taken on the plane indicated by the line 8—8 of Figure 7 and looking in the direction of the arrows.

Figure 9 is a view similar to Figure 8, but showing the gauge member of different dimensions in place for the adjustment of lens straps.

While the present invention is concerned with an improved gauge member as a new article of manufacture, it will be understood that the invention contemplates the use of a series of such gauge members by an optician in order that he may bend lens straps to accommodate lenses of different thicknesses, the gauge members being of graduated thicknesses so as to give the desired range of adjustment. It is now the usual practise for an optician to keep in stock a series of lens mounts having straps adjusted to receive lenses of different thicknesses, the mounting having the straps so bent at the factory. No gauge member or device for permitting these straps to be adjusted by the optician has come into general use. The advantages of adjusting the straps are many. The optician is required to keep in stock a fewer number of mountings and he should always be able to take one of these mountings and adjust the straps to receive any lens. However, in making this adjustment it is essential that the straps shall be pressed toward one another and moved into a position of parallelism and in symmetrical relation to the center line of the lens when in position so that the lens will assume the correct relation to the post. Further, any device of this character which will prove satisfactory must be inexpensive in original cost and convenient in use. It is believed that the improved gauge member satisfies all of these requirements.

In one form, the body $a$ of the improved gauge member is adapted for use adjacent one end only. The gauge member is of generally curved form and has secured to its reverse face a tapered flange $b$ which serves to space the lens straps at their base when the straps are bent toward one another. For convenience, the gauge body $a$ may carry therewith an arm $a'$ having an eye $a^2$ therein for securing the gauge member to a key ring or other retaining device. As shown in Figure 5, the body $a$ of the gauge member is formed with opposite side walls which are disposed in absolute parallelism, the thickness of the gauge body corresponding to the thickness of the lens to be mounted within the lens straps. In the optical trade there are a certain number of standard thicknesses of lens and in realizing the most advantageous objects of the present invention a series of gauge members corresponding to these several standard thicknesses of lens will be furnished so that the optician can adjust the straps to receive any one of these lenses.

A typical mounting is shown at $c$ in Figures 7, 8 and 9. The straps $c'$ thereof receive between them a lens such as $d$ when the straps are properly adjusted. In using the improved gauge $a$ the gaging end thereof is slid in between the straps $c'$ of the mounting to be adjusted. The tapered flange $b$ of the gauge will be thrust in between the straps $c'$ at their base and by reason of the taper on the flange it is evident that it is immaterial what the span of the straps at their base is. The flange $b$ can be moved inwardly between these straps only until the straps bind on the tapered edges of the flange $b$. With the gauge in such position the straps $c'$ will overlie the body $a$ of the gauge. When these straps are engaged by the jaws of an ordinary pair of pliers $e$ they are moved inwardly towards one another until they rest flat against the opposite faces of the gauge $a$. The flange $b$ being of greater width than the gauge $a$ insures a movement of the straps $c'$ inwardly until they assume a position of absolute parallelism and lie in symmetrical relation to the lens when introduced between them. Gauge members as heretofore contemplated have not been of such character as to bring the straps into parallelism and in symmetrical relation to the lens. In the use of such known gauge members it was usual for one strap to be moved inwardly further than another so that it assumed an angular relation thereto and the lens when mounted was not in proper relation to the post. The overhang of the flange $b$ eliminates this objection and insures the proper positioning of the lens straps $c'$ when bent with an ordinary pair of pliers.

The gauge $f$ shown in Figure 4 is double ended, being provided with flanges $g$, $h$ of different widths at its opposite ends, so that one or the other of the flanges might readily be moved in between the lens straps regardless of their initial spacing. However, in this form of gauge, the gauge $f$ proper is of uniform thickness throughout its length, so that the adjustment of the straps will be the same, no matter what end of the gauge is inserted between the straps. It is evident that this principle might be employed to provide two gauge members in a single body. In such case one end of the gauge $f$ would be of different thickness from the other end and the proper end inserted between the straps depending upon the thickness of the lens to be mounted. As shown in Figure 9, the gauge $f$ is used in association with a pair of pliers $e$ in the precise manner hereinbefore described. The possible range of adjustment of the lens straps $c'$ from their initial spread is well indicated by the two views of Figures 8 and 9. With a mounting having the spread shown in Figure 8 it is evident that the straps can be readily moved together to receive a thinner lens by employing a thinner gauge member, such as $f$ shown in Figure 9, the adjustment moving the straps toward one another uniformly and bringing them into parallelism.

The important feature of the improved gauge resides in the provision of the overhanging flange $b$ whereby the base of the straps is held in spaced relationship while the bodies thereof can be bent to the desired span.

I claim as my invention:

1. A gauge for eyeglass mountings, comprising a curved body section to rest between the straps, and a flange carried with the body section for its entire length and extending equal distances from its sides.

2. A gauge for eyeglass mountings, comprising a curved body section to rest between the straps, and a flange tapered symmetrically and extending equal distances from the sides of the body section and for its entire length.

3. A gauge for eyeglass mountings, comprising a curved body section to rest between the straps and a tapered flange carried with the body section and extending equal distances from its sides.

4. A gauge for eyeglass mountings, comprising a body section to rest between the straps and having its sides in parallelism, and reversely tapered flanges at opposite ends of the body section and of varying widths.

This specification signed this 19th day of May A. D. 1920.

MARINIUS HANSEN.